United States Patent
Ozawa et al.

(10) Patent No.: US 7,705,483 B2
(45) Date of Patent: Apr. 27, 2010

(54) DC-DC CONVERTER CONTROL CIRCUIT, DC-DC CONVERTER, POWER SUPPLY UNIT, AND DC-DC CONVERTER CONTROL METHOD

(75) Inventors: Hidekiyo Ozawa, Kasugai (JP); Morihito Hasegawa, Kasugai (JP)

(73) Assignee: Fujitsu Microelectronics Limited, Yokohama (JP)

( * ) Notice: Subject to any disclaimer, the term of this patent is extended or adjusted under 35 U.S.C. 154(b) by 0 days.

(21) Appl. No.: 11/526,051

(22) Filed: Sep. 25, 2006

(65) Prior Publication Data

US 2007/0210649 A1 Sep. 13, 2007

(30) Foreign Application Priority Data

Mar. 6, 2006 (JP) ............................. 2006-058861

(51) Int. Cl.
*H02J 3/00* (2006.01)
*H02J 1/00* (2006.01)
*H02J 1/04* (2006.01)

(52) U.S. Cl. ...................................................... 307/31
(58) Field of Classification Search .................. 307/31, 307/15, 39; 323/282–286
See application file for complete search history.

(56) References Cited

U.S. PATENT DOCUMENTS 5,672,303 A 9/1997 Metzger et al.

| 6,147,477 | A | 11/2000 | Saeki et al. |
| 6,664,772 | B2 | 12/2003 | Saeki et al. |
| 6,911,806 | B2 * | 6/2005 | Saeki et al. .................. 323/273 |
| 2005/0225307 | A1 * | 10/2005 | Sato et al. ..................... 323/282 |

FOREIGN PATENT DOCUMENTS

| JP | 09-154275 A | 6/1997 |
| JP | 10-323026 A | 12/1998 |

* cited by examiner

*Primary Examiner*—Albert W Paladini
*Assistant Examiner*—Carlos Amaya
(74) *Attorney, Agent, or Firm*—Arent Fox LLP

(57) ABSTRACT

An object of the present invention is to provide a DC-DC converter control circuit capable of maintaining, even when any one of a plural number of DC-DC converters enters the abnormal state due to the occurrence of a failure, a voltage relationship between the output voltage of the faulty DC-DC converter and the output voltage of another DC-DC converter. An error amplifier ERA1G has an inverting input, a first non-inverting input, and a second non-inverting input. A first divided voltage VV1 provided from a first voltage divider circuit VD1 is fed into the inverting input; a reference voltage e1G from ground is fed into the first non-inverting input; and a second divided voltage VV2 provided from a second voltage divider circuit VD2 is fed into the second non-inverting input. The error amplifier ERA1G amplifies the error between the lower of the two voltage inputs fed into the two non-inverting inputs (i.e. the lower of the reference voltage e1G and the second divided voltage VV2), and the first divided voltage VV1 fed into the inverting input. The output terminal of the error amplifier ERA1G is connected to the input terminal of a PWM unit P1G.

14 Claims, 8 Drawing Sheets

CIRCUIT DIAGRAM OF POWER SUPPLY UNIT 10 IN FIRST EMBODIMENT

DIAGRAM SHOWING PRINCIPLE OF THE PRESENT INVENTION

FIG. 2 CIRCUIT DIAGRAM OF POWER SUPPLY UNIT 10 IN FIRST EMBODIMENT

GRAPH REPRESENTING FIRST CORRELATION BETWEEN
REFERENCE VOLTAGE AND OUTPUT VOLTAGE IN POWER SUPPLY UNIT 10

GRAPH REPRESENTING SECOND CORRELATION BETWEEN
REFERENCE VOLTAGE AND OUTPUT VOLTAGE IN POWER SUPPLY UNIT 10

FIG. 5 CIRCUIT DIAGRAM OF POWER SUPPLY UNIT 10a IN SECOND EMBODIMENT

FIG. 6   GRAPH REPRESENTING OUTPUT VOLTAGE IN POWER SUPPLY UNIT 10a

CIRCUIT DIAGRAM OF POWER SUPPLY UNIT 10c IN THIRD EMBODIMENT

CIRCUIT DIAGRAM OF POWER SUPPLY UNIT 10d

US 7,705,483 B2

DC-DC CONVERTER CONTROL CIRCUIT, DC-DC CONVERTER, POWER SUPPLY UNIT, AND DC-DC CONVERTER CONTROL METHOD

CROSS-REFERENCE TO RELATED APPLICATIONS

This application is based upon and claims the benefit of priority from each of the prior Japanese Patent Application No. 2006-058861 filed on Mar. 6, 2006, the entire contents of which are incorporated herein by reference.

BACKGROUND OF THE INVENTION

1. Field of the Invention

This invention relates generally to DC-DC converter control circuits, DC-DC converters, power supply units, and DC-DC converter control methods and more specifically to a technology capable of maintaining a specified voltage relationship existing between the output voltages of DC-DC converters.

2. Description of Related Art

In a power supply unit which is equipped with a plurality of DC-DC converters and which provides a plurality of output voltages, it might be necessary to constantly maintain the relative voltage relationship between power supply voltages. For example, when supplying a power supply voltage Vcc and a high-order backgate voltage VBGP to a PMOS transistor, it is necessary to maintain a voltage relationship so that the power supply voltage Vcc constantly falls below the high-order backgate voltage VBGP in a series of sequences from the time power is turned on to the time power is turned off, the reason for which is to prevent the occurrence of a burnout et cetera due to latch-up.

As the related art of the above, Japanese unexamined patent publication No. 9(1997)-154275 and Japanese unexamined patent publication No. 10(1998)-323026 have been disclosed.

SUMMARY OF THE INVENTION

Such a voltage relationship must be maintained not only when the power supply unit operates normally, but also when it fails to operate normally. For example, if a certain DC-DC converter of a plurality of DC-DC converters becomes out of order due to a failure or the like and suffers a drop in output voltage, this makes it necessary to maintain such a voltage relationship between the faulty DC-DC converter and another DC-DC converter that the latter has to provide an output voltage equal to or less than the output voltage of the former. The problem with the foregoing conventional technologies is that there is no disclosure about control for maintaining the aforesaid voltage relationship when abnormalities occur. If logical circuits are provided for the purpose of providing control for maintaining the voltage relationship at the time of abnormality occurrence, this presents another problem, i.e. the increase in circuit size of the DC-DC converter control circuit.

The present invention was made with a view to providing solutions to at least one of the problems with the foregoing conventional technologies. Accordingly, a general object of the present invention is to provide: DC-DC converter control circuits, DC-DC converters, power supply units, and DC-DC converter control methods, thereby making it possible to maintain, even when any one of a plurality of DC-DC converters enters the abnormal state due to the occurrence of a failure, the predetermined voltage relationship between the output voltage of the faulty DC-DC converter and the output voltage of another DC-DC converter.

To achieve the above purpose, the present invention provides a control circuit for a DC-DC converter which provides a plurality of output voltages, the DC-DC converter control circuit comprising an error amplifier which includes: a first polarity input terminal at which a voltage according to a first output voltage of the plurality of output voltages is input; a second polarity first input terminal at which a reference voltage for setting a target value for the first output voltage is input; and a second polarity second input terminal at which a voltage according to a second output voltage of the plurality of output voltages is input, wherein the error amplifier amplifies the error between (i) the lower of the voltage input at the second polarity first input terminal and the voltage input at the second polarity second input terminal and (ii) the voltage input at the first polarity input terminal.

The DC-DC converter provides a plurality of output voltages. As such a type of DC-DC converter which provides a plurality of output voltages, there is for example a DC-DC converter with a plurality of DC-DC converter sections which provide output voltages. The DC-DC converter control circuit controls the DC-DC converter according to the reference voltage. Here, the description will be made focusing attention on two specific output voltages of the plurality of output voltages, i.e. a first output voltage and a second output voltage that has a predetermined potential relationship with the first output voltage. There exists a specified voltage relationship between the second output voltage and the first output voltage, in other words the first output voltage has a voltage value equal to or less than the voltage value of the second output voltage. It should be noted that any one of the plurality of output voltages can be extracted as a first output voltage. In addition, neither the number of first output voltages nor the number of second output voltages is limited to a singular number. That is, every output voltage of the plurality of output voltages that has a value equal to or greater than the value of the first output voltage corresponds to a second output voltage. In addition, in some cases, a certain output voltage becomes a first output voltage in relationship to another certain output voltage while simultaneously it becomes a second output voltage in relationship to a still another output voltage.

The DC-DC converter control circuit is equipped with an error amplifier. The error amplifier has a first polarity input terminal, a second polarity first input terminal, and a second polarity second input terminal. Here, the first polarity-second polarity combination is either the combination of an inverting input and non-inverting inputs or the combination of a non-inverting input and inverting inputs. Which of these combinations is employed is determined according to the circuitry of the rear stage of the error amplifier. The first polarity input terminal is fed a voltage according to the first output voltage. Either a divided voltage of the first output voltage may be applied to the first polarity input terminal, or the first output voltage may be applied directly to the first polarity input terminal. The second polarity first input terminal is fed a reference voltage for setting a target value for the first output voltage. The second polarity second input terminal is fed a voltage according to the second output voltage. And, the error between (a) the lower of the reference voltage fed into the second polarity first input terminal and the voltage according to the second output voltage fed into the second polarity second input terminal and (b) the first output voltage fed into the first polarity input terminal, is amplified.

The operation is described. When the DC-DC converter control circuit is operating normally, the value of the first output voltage is made equal to or lower than that of the second output voltage. At this time, the value of the reference voltage is equal to or lower than the value of the voltage according to the second output voltage, and the error amplifier amplifies the error between the reference voltage and the voltage according to the first output voltage.

The description is made in regard to a case where there is a change in state from the normal state to the abnormal state due to the occurrence of a failure or the like and, as a result, the second output voltage drops to a lower value. As the second output voltage decreases, the voltage according to the second output voltage likewise decreases. When the voltage according to the second output voltage falls below the reference voltage, the error amplifier amplifies the error between the voltage according to the second output voltage in place of the reference voltage and the voltage according to the first output voltage. Consequently, the first output voltage falls in such manner as to follow the drop in the second output voltage. This therefore prevents the first output voltage from assuming a value equal to or greater than that of the second output voltage.

The above arrangement makes it possible to constantly enable the first output voltage to have a value equal to or less than that of the second output voltage even when abnormalities, such as the drop in the second output voltage, discontinuation et cetera, occur in the voltage relationship in which the first output voltage has to be controlled such that it has a value equal to or less than the value of the second output voltage.

According to another aspect, the present invention provides a DC-DC converter which provides a plurality of output voltages, wherein the DC-DC converter comprises an error amplifier which includes: a first polarity input terminal at which a voltage according to a first output voltage of the plurality of output voltages is input; second polarity first input terminal at which a reference voltage for setting a target value for the first output voltage is input; and a second polarity second input terminal at which a voltage according to a second output voltage of the plurality of output voltages is input, wherein the error amplifier amplifies the error between (i) the lower of the voltage input at the second polarity first input terminal and the voltage input at the second polarity second input terminal and (ii) the voltage input at the first polarity input terminal.

According to another aspect, the present invention provides a semiconductor device for controlling a DC-DC converter which provides a plurality of output voltages, wherein the semiconductor device comprises an error amplifier which includes: a first polarity input terminal at which a voltage according to a first output voltage of the plurality of output voltages is input; a second polarity first input terminal at which a reference voltage for setting a target value for the first output voltage is input; and a second polarity second input terminal at which a voltage according to a second output voltage of the plurality of output voltages is input, wherein the error amplifier amplifies the error between (i) the lower of the voltage input at the second polarity first input terminal and the voltage input at the second polarity second input terminal and (ii) the voltage input at the first polarity input terminal.

According to another aspect, the present invention provides a control method for controlling a DC-DC converter which provides a plurality of output voltages, wherein the DC-DC converter control method comprising the steps of: outputting a voltage according to a first output voltage of the plurality of output voltages; outputting a reference voltage for setting a target value for the first output voltage; outputting a voltage according to a second output voltage of the plurality of output voltages; and amplifying the error between (i) the lower of the reference voltage and the voltage according to the second output voltage and (ii) the voltage according to the first output voltage.

Also in the DC-DC converter, the semiconductor device, and the DC-DC converter control method which are described above, it becomes possible to constantly enable the first output voltage to have a value equal to or less than that of the second output voltage even when abnormalities, such as the drop in the second output voltage, discontinuation et cetera, occur in the voltage relationship in which the first output voltage has to be controlled such that it has a value equal to or less than the value of the second output voltage.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 6 is a graph which represents the output voltage in the power supply unit 10a;

DETAILED DESCRIPTION OF THE PREFERRED EMBODIMENTS

Figure 1:
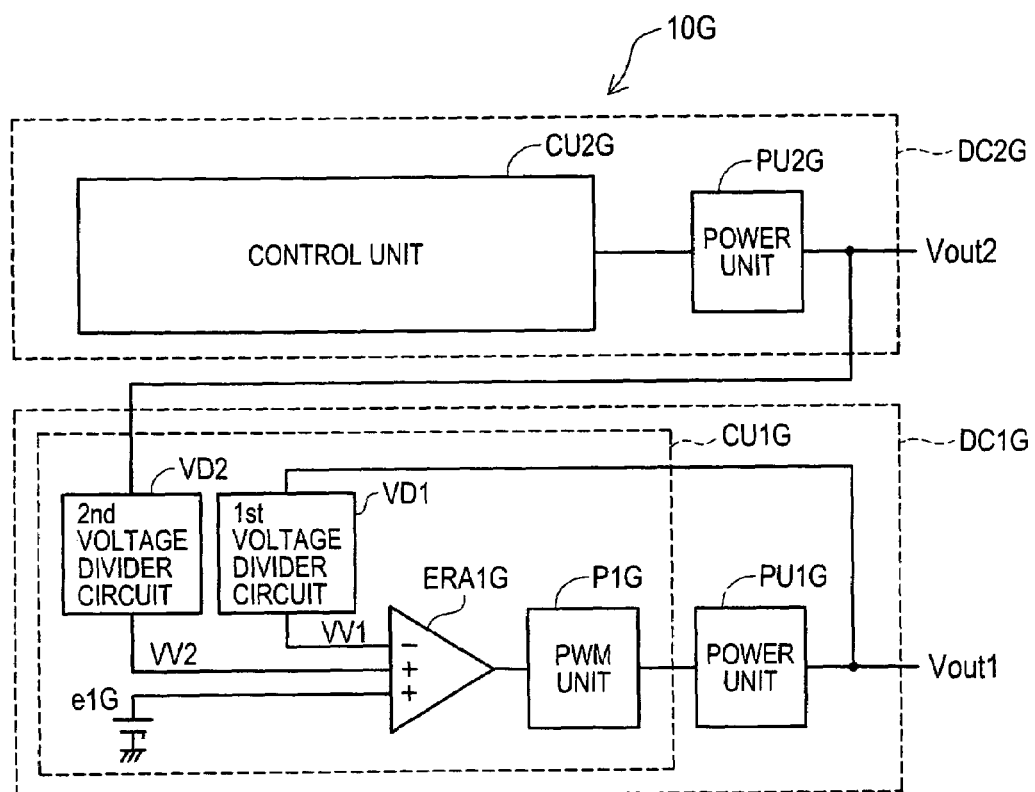
FIG. 1 is a diagram which illustrates the principle of the present invention.

Referring first to FIG. 1, there is shown a diagram which illustrates the principle of the present invention. FIG. 1 shows a DC-DC converter DC1G and a DC-DC converter DC2G which are extracted from among a plurality of DC-DC converters provided in a power supply unit 10G. The DC-DC converter DC1G is a circuit which creates a first output voltage Vout1 and the DC-DC converter DC2G is a circuit which creates a second output voltage Vout2. There exists a specified voltage relationship between the second output voltage Vout2 and the first output voltage Vout1, in other words the first output voltage Vout1 has a voltage value equal to or less than the voltage value of the second output voltage Vout2.

The DC-DC converter DC1G is equipped with a control unit CU1G and a power unit PU1G. The control unit CU1G is equipped with an error amplifier ERA1G, a PWM unit P1G, a first voltage divider circuit VD1, and a second voltage divider circuit VD2. The first output voltage Vout1 is fed into the first voltage divider circuit VD1 and the second output voltage Vout2 is fed into the second voltage divider circuit VD2. The inverting input of the error amplifier ERA1G is fed a first divided voltage VV1 provided from the first voltage divider circuit VD1. In addition, the first non-inverting input of the error amplifier ERA1G is fed a reference voltage e1G from ground, while on the other hand the second non-inverting input of the error amplifier ERA1G is fed a second divided voltage VV2 provided from the second voltage divider circuit VD2. The output terminal of the error amplifier ERA1G is connected to the input terminal of the PWM unit P1G. The output terminal of the PWM unit P1G is connected to the input terminal of the power unit PU1G. The error amplifier ERA1G is an error amplifier adapted to amplify the error between the lower of the two voltage inputs fed into the two non-inverting inputs, i.e. the reference voltage e1G or the second divided voltage VV2 whichever is lower, and the first divided voltage VV1 fed into the inverting input.

Likewise, the DC-DC converter DC2G is equipped with a control unit CU2G and a power unit PU2G. The second output voltage Vout2 provided from the power unit PU2G is fed into the second voltage divider circuit VD2. The other configurations of the DC-DC converter DC2G are the same as the DC-DC converter DC1G and their detailed description is omitted here.

The operation is described. When the power supply unit 10G is in the normal operating state, the first output voltage Vout1 is held to a value equal to or less than the value of the second output voltage Vout2. In other words, the reference voltage e1G is held to a value equal to or less than the value of the second divided voltage VV2. The error amplifier ERA1G amplifies the error between the reference voltage e1G and the first divided voltage VV1.

The description is made in regard to a case where the power supply unit 10G changes state to the abnormal state from the normal state due to the occurrence of a failure or the like in the DC-DC converter DC2G and, as a result, the second output voltage Vout2 drops to a lower value. In response to the drop in the second output voltage Vout2, the second divided voltage VV2 likewise falls. If the second divided voltage VV2 falls below the reference voltage e1G, then the error amplifier ERA1G amplifies the error between the second divided voltage VV2 in place of the reference voltage e1G and the first divided voltage VV1. Consequently, the first output voltage Vout1 falls in such manner as to follow the drop in the second output voltage Vout2, whereby the first output voltage Vout1 is maintained at a value equal to or less than the value of the second output voltage Vout2. On the other hand, when the first output voltage Vout1 drops to a lower value due to the occurrence of a failure or the like in the DC-DC converter DC1G, the voltage relationship in which the first output voltage Vout1 has to be controlled so as to have a value equal to or less than the value of the second output voltage Vout2 is maintained without depending on special control.

As described above, for the case of the voltage relationship in which the first output voltage Vout1 has to be controlled so as to have a value equal to or less than the value of the second output voltage Vout2, it becomes possible to surely allow the first output voltage Vout1 to have a value equal to or less than the second output voltage Vout2, even when a failure, such as a drop in the second output voltage Vout2, discontinuation et cetera, occurs.

Figure 2:
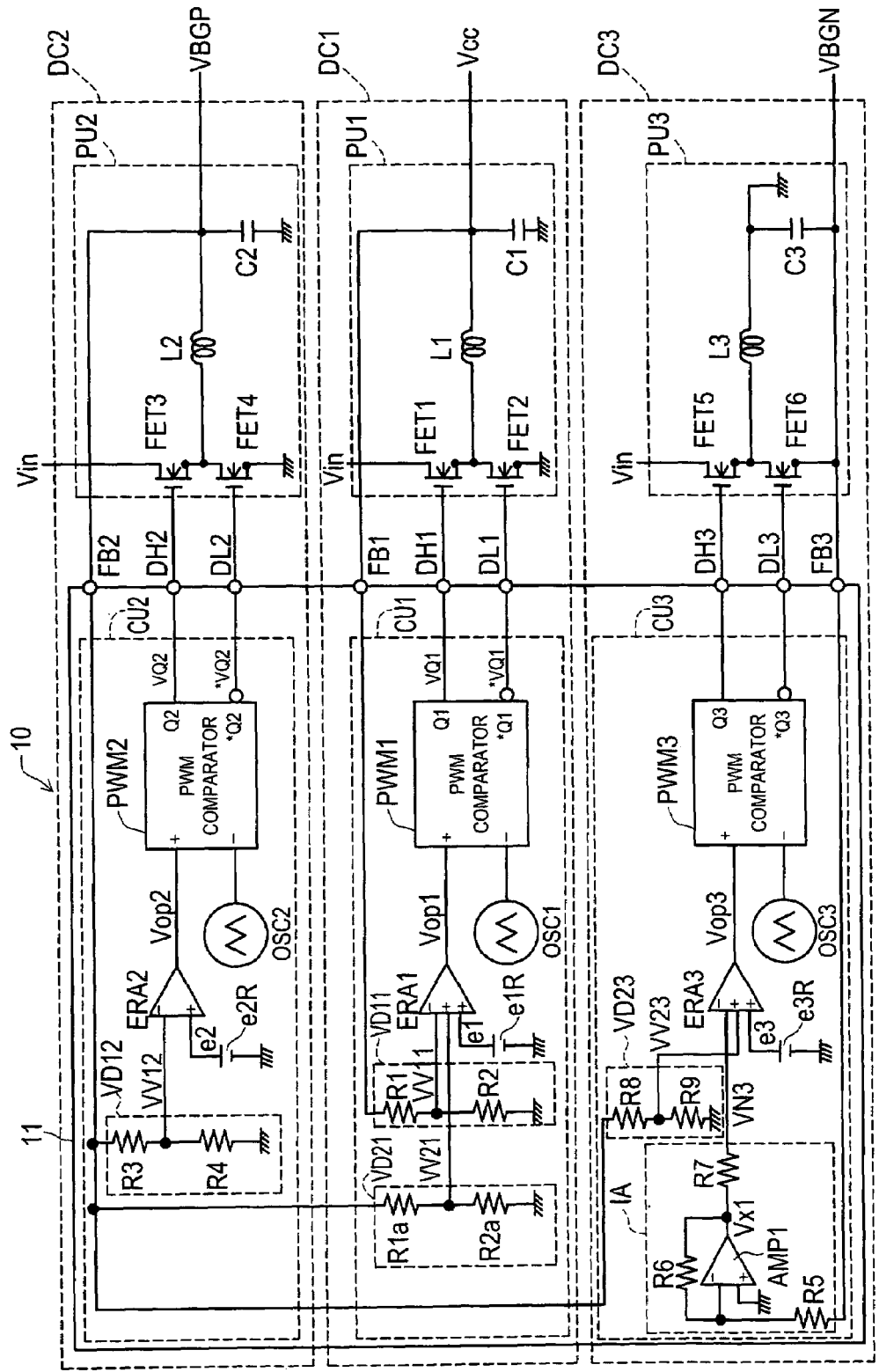
FIG. 2 is a circuit diagram of a power supply unit 10 in accordance with a first embodiment of the present invention.
Figure 3:
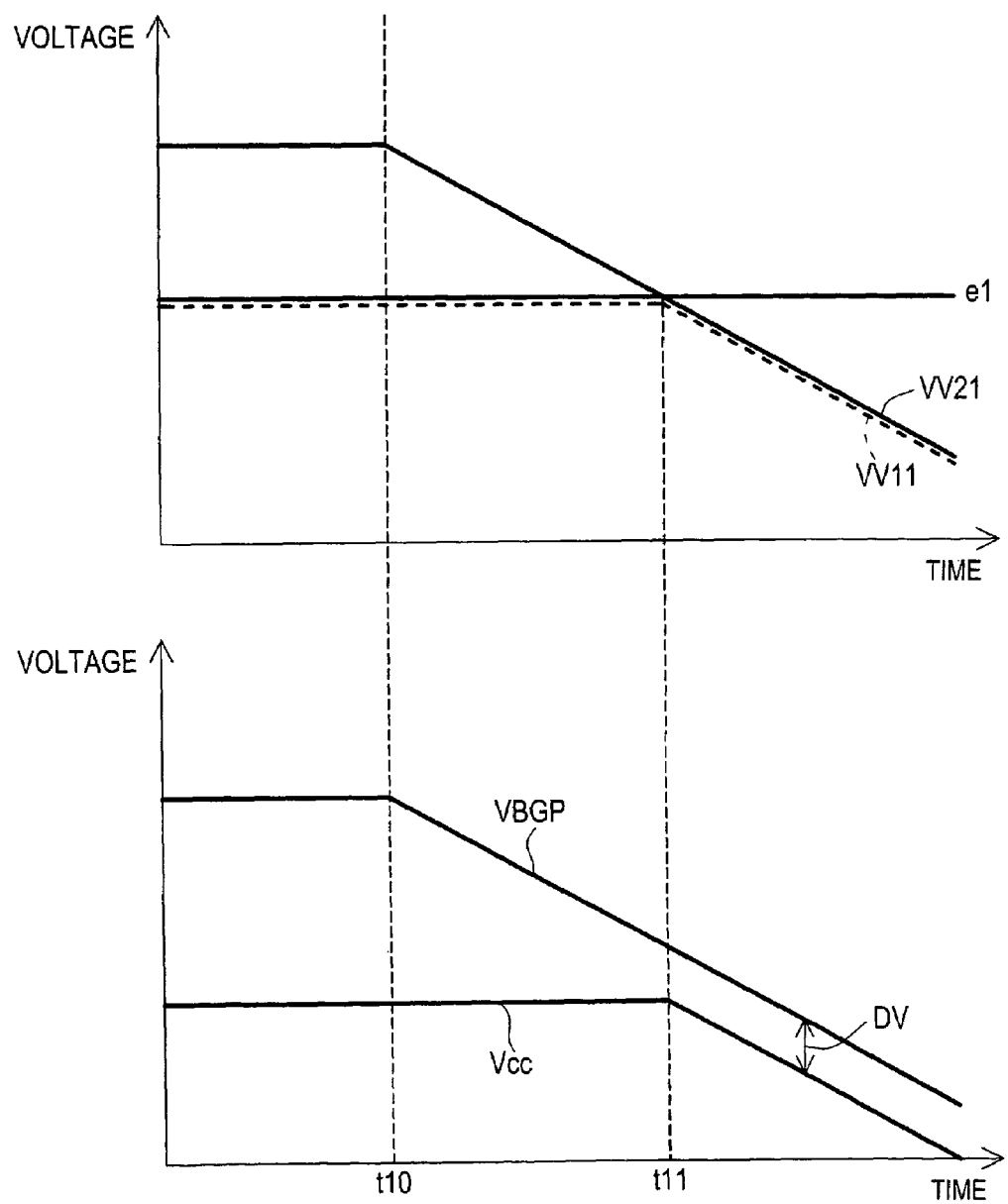
FIG. 3 is a graph which represents a first correlation between the reference voltage and the output voltage in the power supply unit 10.
Figure 4:
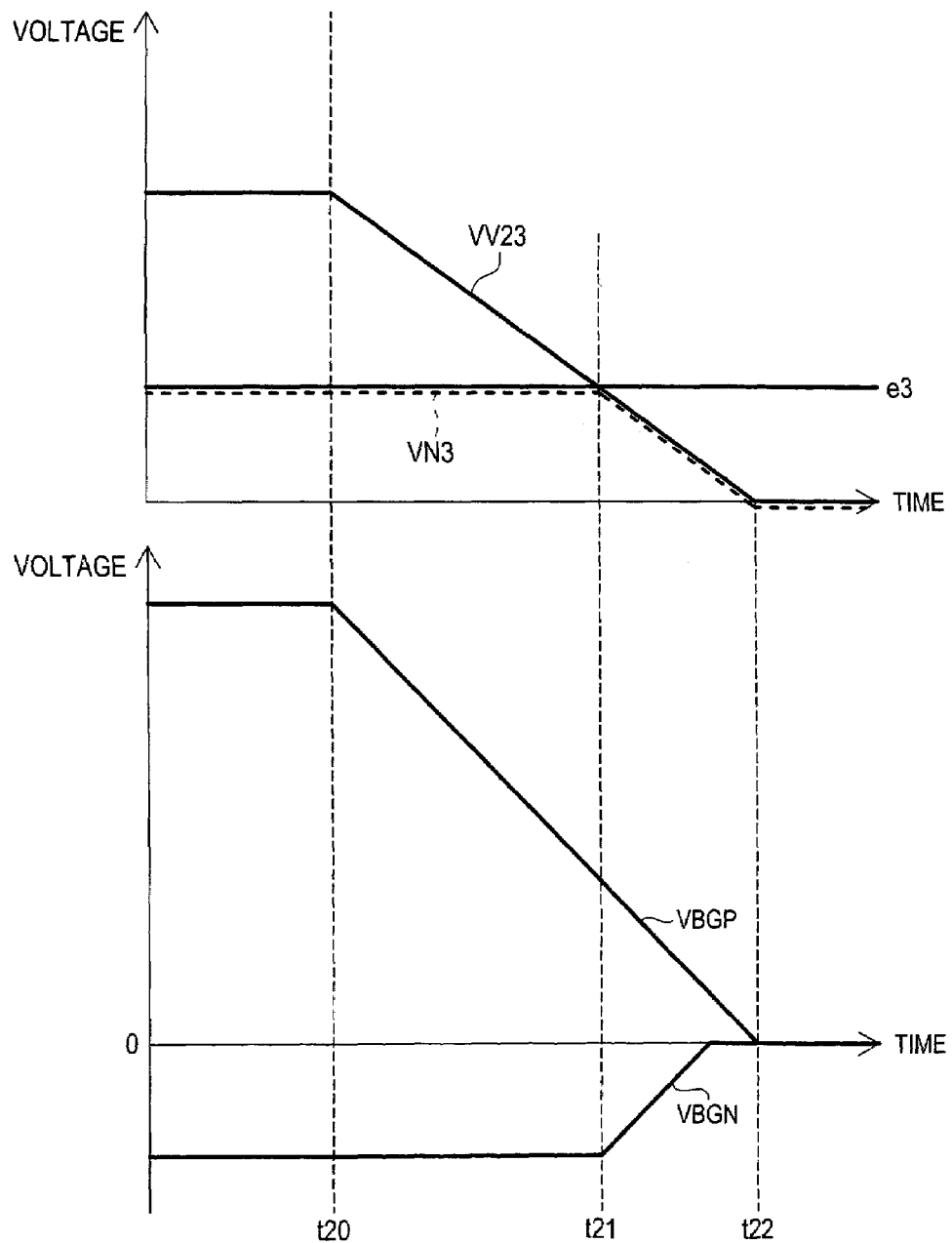
FIG. 4 is a graph which represents a second correlation between the reference voltage and the output voltage in the power supply unit 10.

With reference to FIGS. 2 through 4, a first embodiment of the present invention is now descried. FIG. 2 shows a power supply unit 10 formed in accordance with the first embodiment. The power supply unit 10 is equipped with DC-DC converters DC1-DC3. A DC-DC converter control circuit 11 is provided which is common to the DC-DC converters DC1-DC3. The DC-DC converter DC1 is a circuit which creates a power supply voltage Vcc for a semiconductor device. The DC-DC converter DC2 is a circuit which creates a high-order backgate voltage VBGP which is the backgate voltage of a p-type MOSFET of a semiconductor device (not shown). The DC-DC converter DC3 is a circuit which creates a low-order backgate voltage VBGN which is the backgate voltage of an n-type MOSFET of a semiconductor device.

The DC-DC converter DC1 is equipped with a control unit CU1 and a power unit PU1, and provides the power supply voltage Vcc. In the power unit PU1, an input voltage Vin is coupled to the input terminal of a transistor FET1 which is a main switching element and the input terminal of a choke coil L1 is connected to the output terminal of the transistor FET1. The output terminal of the choke coil L1 is connected to the output terminal, Vcc, of the DC-DC converter DC1. In addition, the output terminal, DH1, of the DC-DC converter control circuit 11 is connected to the control terminal of the transistor FET1. The input terminal of a transistor FET2 which is a synchronous rectification switching element is connected to ground, while the output terminal of the transistor FET2 is connected to the input terminal of the choke coil L1. In addition, the output terminal, DL1, of the DC-DC converter control circuit 11 is connected to the control terminal of the transistor FET2. Connected between the output terminal Vcc of the DC-DC converter DC1 and ground is a smoothing capacitor C1. In addition, the output terminal Vcc is connected to the input terminal, FB1, of the DC-DC converter control circuit 11.

The control unit CU1 is equipped with an error amplifier ERA1, a PWM comparator PWM1, a triangular pulse oscillator OSC1, a reference voltage generator circuit e1R, a voltage divider circuit VD11, and a voltage divider circuit VD21. The voltage divider circuit VD11 includes an input resistor R1 and a ground resistor R2 which are connected in series between the input terminal FB1 and ground. On the other hand, the voltage divider circuit VD21 includes an input resistor R1$a$ and a ground resistor R2$a$ which are connected in series between the input terminal FB2 and ground. The power supply voltage Vcc is fed into the voltage divider circuit VD11 which then provides a divided voltage VV11. In addition, the high-order backgate voltage VBGP is fed into the voltage divider circuit VD21 which then provides a divided voltage VV21.

The divided voltage VV11 is fed into the inverting input of the error amplifier ERA1. In addition, the first non-inverting input of the error amplifier ERA1 receives a reference voltage e1 from ground, while the second non-inverting input of the error amplifier ERA1 receives the divided voltage VV21. The error amplifier ERA1 gives an output voltage Vop1 to the non-inverting input of the PWM comparator PWM1. In addition, the triangular pulse oscillator OSC1 gives an output signal to the inverting input of the PWM oscillator PWM1. An output signal VQ1 provided from the non-inverting output terminal, Q1, of the PWM comparator PWM1 is fed into the output terminal DH1. In addition, an output signal *VQ1 provided from the inverting output terminal, *Q1, of the PWM comparator PWM1 is fed into the output terminal DL1. Here, the voltage division ratio, DVR1, of the voltage divider circuit VD11 is: R2/(R1+R2), while on the other hand the voltage division ratio, DVR2, of the voltage divider circuit VD21 is: R2$a$/(R1$a$+R2$a$). In the power supply unit 10, the voltage division ratio DVR2 is set so as to have a value equal to or less than the value of the voltage division ratio DVR1.

Likewise, the DC-DC converter DC2 is equipped with a control unit CU2 and a power unit PU2, and provides the high-order backgate voltage VBGP. The control unit CU2 includes an error amplifier ERA2, a PWM comparator PWM2, a triangular pulse oscillator OSC2, a reference voltage generator circuit e2R, and a voltage divider circuit VD12.

The voltage divider circuit VD12 includes an input resistor R3 and a ground resistor R4 which are connected in series between the input terminal FB2 and ground. The high-order backgate voltage VBGP is fed into the voltage divider circuit VD12 which then provides a divided voltage VV12. The inverting input terminal of the error amplifier ERA2 receives the divided voltage VV12, while the non-inverting terminal of the error amplifier ERA2 receives a reference voltage e2 from ground. An output voltage Vop2, provided from the error amplifier ERA2, is fed into the non-inverting input of the PWM comparator PWM2. The other configurations of the DC-DC converter DC2 are the same as the DC-DC converter DC1, and their detailed description is omitted here.

Likewise, the DC-DC converter DC3 is equipped with a control unit CU3 and a power unit PU3, and provides the low-order backgate voltage VBGN. The low-order backgate voltage VBGN is a backgate voltage for n-type MOSFET and is a negative voltage. In the power unit PU3, the input voltage Vin is coupled to the input terminal of a transistor FET5 which is a main switching element; the input terminal of a choke coil L3 is connected to the output terminal of the transistor FET5; and the output terminal of the choke coil L3 is connected to ground. In addition, the output terminal, DH3, of the DC-DC converter control circuit 11 is connected to the control terminal of the transistor FET5. The input terminal of a transistor FET6 is connected to VGBN which is the output terminal of the DC-DC converter DC3, while the output terminal of the transistor FET6 is connected to the input terminal of the choke coil L3. In addition, the control terminal of the transistor FET6 is connected to the output terminal of the DC-DC converter control circuit 11. Connected between the output terminal VBGN of the DC-DC converter DC3 and ground is a smoothing capacitor C3. Furthermore, the output terminal VBGN is connected to the input terminal, FB3, of the DC-DC converter control circuit 11.

The control unit CU3 is equipped with an error amplifier ERA3, a PWM comparator PWM3, a triangular pulse oscillator OSC3, a reference voltage generator circuit e3R, an inversion amplifier circuit IA, and a voltage divider circuit VD23. In the inversion amplifier circuit IA, the low-order backgate voltage VBGN is fed, through the input resistor R5, into the inverting input of a voltage amplifier AMP1. In addition, the non-inverting input terminal of the voltage amplifier AMP1 is connected to ground. In addition, connected between the inverting input and output terminals of the voltage amplifier AMP1 is a feedback resistor R6. The output terminal of the voltage amplifier AMP1 is connected, through an input resistor R7, to the inverting input of the error amplifier ERA3. In addition, the voltage divider circuit VD23 is provided with an input resistor R8 and a ground resistor R9 which are connected in series between the input terminal FB2 and ground.

The high-order backgate voltage VBGP is fed into the voltage divider circuit VD23 which then provides a divided voltage VV23. In addition, the first non-inverting input of the error amplifier ERA3 receives a reference voltage e3 from ground, while the second non-inverting input of the error amplifier ERA3 receives the divided voltage VV23. An output voltage Vop3 provided from the error amplifier ERA3 is fed into the non-inverting input of the PWM comparator PWM3. In addition, the input resistor R5 and the feedback resistor R6 are made identical in resistor value with each other, whereby the output voltage, Vx1, of the voltage amplifier AMP1 becomes a positive voltage which is the absolute value of the low-order backgate voltage VBGN. The other configurations are the same as the DC-DC converter DC1, and their detailed description is omitted here.

In the first place, the operation of the DC-DC converter DC2 is described. The output voltage VGBP of the DC-DC converter DC2 which is fed into the input terminal FB2 of the DC-DC converter control circuit 11 is subjected to voltage division by the voltage divider circuit VD12 and is then fed, as the divided voltage VV12, into the inverting input of the error amplifier ERA2. The error amplifier ERA2 amplifies the difference between the divided voltage VV12 and the reference voltage e2 and provides the amplified difference as the output voltage Vop2. If the high-order backgate voltage VBGP decreases thereby increasing the difference between the reference voltage e2 and the divided voltage VV12, this causes the output voltage Vop2 to increase. On the other hand, if the high-order backgate voltage VBGP increases thereby decreasing the difference between the reference voltage e2 and the divided voltage VV12, this causes the output voltage Vop2 to decrease.

The PWM comparator PWM2 makes a comparison between the output voltage Vop2 and the output voltage of the triangular pulse oscillator OSC2 and issues a high-level output signal VQ2 when the output voltage Vop2 is higher than the output voltage of the triangular pulse oscillator OSC2. Therefore, the PWM comparator PWM2 operates as an output voltage pulse-width modulator adapted to provide a pulse having a pulse width according to the magnitude of the output voltage Vop2. As long as the output signal VQ2 is in the high-level state, the transistor FET3 is placed in the conductive state while the transistor FET4 is placed in the non-conductive state. On the other hand, as long as the output signal VQ2 is in the low-level state, the transistor FET3 is placed in the non-conductive state while the transistor FET4 is placed in the conductive state.

When the transistor FET3 enters the conductive state, an electric current is supplied, through the choke coil L2, to the load from the input voltage Vin, and energy is stored in the choke coil L2. Subsequently, the transistor FET3 enters the non-conductive state and the transistor FET4 enters the conductive state, as a result of which the energy stored in the choke coil L2 is discharged. The high-order backgate voltage VBGP at this time can be given by the following expression:

$$VBGP=Ton/(Ton+Toff) \times Vin=Ton/T \times Vin \qquad \text{Expression (1),}$$

wherein Ton is the ON time of the transistor FET3 and Toff is the OFF time of the transistor FET3.

In the above-described DC-DC converter DC2, the high-order backgate voltage VBGP is controlled by amplifying the difference between the divided voltage VV12 and the reference voltage e2 in the error amplifier ERA2. Therefore, by making an appropriate change in the voltage division ratio of the voltage divider circuit VD12, the ON duty of the transistor FET3 is controlled, whereby the value of the high-order backgate voltage VBGP can be controlled variably. Here, needless to say, the high-order backgate voltage VBGP can be controlled variably by changing the value of the reference voltage e2.

In the following, the operation of the DC-DC converter DC1 is described. The power supply voltage Vcc, which is provided from the DC-DC converter DC1 and which is then fed into the input terminal FB1 of the DC-DC converter control circuit 11, is subjected to voltage division by the voltage divider circuit VD11 and is then fed into the inverting input of the error amplifier ERA1 as the divided voltage VV11. In addition, the reference voltage e1 is fed into the non-inverting input of the error amplifier ERA1. Additionally, the high-order backgate voltage VBGP is subjected to voltage division by the voltage divider circuit VD21 and is then fed into the non-inverting input of the error amplifier ERA1 as the divided voltage VV21. The error amplifier ERA1 is a voltage amplifier configured to amplify the difference between the lower of the two voltage inputs fed into the two non-inverting inputs (i.e. the reference voltage e1 or the divided voltage VV21 whichever is lower) and the divided voltage VV11 fed into the inverting input. Therefore, when the reference voltage e1 falls below the divided voltage VV21, the error amplifier ERA1 amplifies the difference between the divided voltage VV11 and the reference voltage e1, while on the other hand when the reference voltage e1 exceeds the divided voltage VV21, the error amplifier ERA1 amplifies the difference between the divided voltage VV11 and the divided voltage VV21. The other operations are the same as the DC-DC converter DC2, and their description is omitted here.

With reference to FIG. 3, the operation of the DC-DC converter DC1 when the high-order backgate voltage VBGP drops to a lower value due to the occurrence of a failure to the DC-DC converter DC2 is described. Until time t10, the state is normal because no failure has occurred so far, and the divided voltage VV11 (indicated by the dashed line in FIG. 3) is made equal to the reference voltage e1. From time t10 on, the high-order backgate voltage VBGP starts falling due to a failure occurring in the DC-DC converter DC2. As the high-order backgate voltage VBGP falls, the divided voltage VV21 likewise falls. During a period from time t10 until time t11, the reference voltage e1 is lower than the divided voltage VV21, and the error amplifier ERA1 amplifies the error between the reference voltage e1 and the divided voltage VV11. Therefore, as shown in FIG. 3, the power supply voltage Vcc assumes a constant value according to the reference voltage e1. From time t11 on, the divided voltage VV21 becomes lower than the reference voltage e1, and the error amplifier ERA1 amplifies the error between the divided voltage VV21 and the divided voltage VV11. Therefore, as shown in FIG. 3, the divided voltage VV11 falls in such manner as to follow the drop in the divided voltage VV21. And the power supply voltage Vcc falls in such manner as to follow the drop in the high-order backgate voltage VBGP.

Here, suppose that the voltage division ratio DVR2 of the voltage divider circuit VD21 is set to a value equal to or less than the value of the voltage division ratio DVR1 of the voltage divider circuit VD11. As a result of such setting, the high-order backgate voltage VBGP starts falling from time t10 on, and the divided voltage VV21 becomes equal to the divided voltage VV11 when the voltage difference from the power supply voltage Vcc becomes a differential voltage DV at time t11. That is to say, the differential voltage DV can be set by providing a differential between the voltage division ratio DVR1 and the voltage division ratio DVR2. And the differential voltage DV serves as a buffer zone for maintaining the voltage relationship in which the power supply voltage Vcc is made to constantly have a value equal to or less than the value of the high-order backgate voltage VBGP. Here, as the voltage division ratio DVR2 is made lower than the voltage division ratio DVR1, the value of the differential voltage DV can be made greater. In addition, when the power supply voltage Vcc drops to a lower value due to the occurrence of a failure or the like in the DC-DC converter DC1, the voltage relationship in which the power supply voltage Vcc has to be controlled so as to have a value equal to or less than the value of the high-order backgate voltage VBGP is maintained without depending on special control.

Because of the above, in the case where a specified voltage relationship, in which the power supply voltage Vcc is made constantly equal to or lower than the high-order backgate voltage VBGP, is previously fixed, it becomes possible to allow the output of the power supply voltage Vcc to fall in such manner as to follow the drop in the high-order backgate voltage VBGP, even when a situation that causes the high-order backgate voltage VBGP to fall occurs. In addition, even when a failure that causes discontinuation of the high-order backgate voltage VBGP, the power supply voltage Vcc can be cut off in sync with the discontinuation of the high-order backgate voltage VBGP.

In the following, the operation of the DC-DC converter DC3 is described. With reference to FIG. 2, the high-order backgate voltage VBGP, which is fed into the input terminal FB2 of the DC-DC converter control circuit 11, is subjected to voltage division by the voltage divider circuit VD23 and is then fed into the inverting input of the error amplifier ERA3 as the divided voltage VV23. In addition, the low-order backgate voltage VBGN, which is fed into the input terminal FB3, is fed, through the input resistor R5, into the inverting input of the voltage amplifier AMP1. The voltage amplifier AMP1 is a polarity inversion circuit configured to convert the low-order backgate electrode VBGN which is a negative voltage provided from the DC-DC converter DC3 into a positive voltage. Since the input resistor R5 and the feedback resistor R6 are made equal to each other in resistance value, the voltage amplifier AMP1 provides, as the output voltage Vx1, a positive voltage equal to the low-order backgate voltage VBGN. In other words, the absolute value of the low-order backgate voltage VBGN is the output voltage Vx1. The output voltage Vx1 is fed, through the input resistor R7, into the inverting input of the error amplifier ERA3 as a voltage VN3.

The error amplifier ERA3 is a voltage amplifier configured to amplify the difference between the lower of the two voltage inputs fed into the two non-inverting inputs (i.e. the reference voltage e3 or the divided voltage VV23 whichever is lower) and the voltage VN3 fed into the inverting input. The other operations are the same as the DC-DC converter DC1, and their description is omitted here.

And there is previously fixed a specified voltage relationship between the low-order backgate voltage VBGN and the high-order backgate voltage VBGP so that when the high-order backgate voltage VBGP becomes 0 (V) due to the occurrence of a failure or the like to the DC-DC converter DC2 the low-order backgate voltage VBGN also becomes 0 (V).

Referring now to FIG. 4, a case where the failure of the DC-DC converter DC2 causes the high-order backgate voltage VBGP to fall is exemplarily described. Until time t20, the state is normal because no failure has occurred so far, and the voltage VN3 (indicated by the dashed line in FIG. 4) is made equal to the reference voltage e3. From time t20 on, the high-order backgate voltage VBGP starts falling due to a failure occurring to the DC-DC converter DC2. As the high-order backgate voltage VBGP falls, the divided voltage VV23 likewise falls. During a period from time t20 until time t21, the reference voltage e3 is lower than the divided voltage VV23, and the error amplifier ERA3 amplifies the error between the reference voltage e3 and the voltage VN3. Therefore, as shown in FIG. 4, the low-order backgate voltage VBGN assumes a constant value according to the reference voltage e3.

From time t21 on, the divided voltage VV23 becomes lower than the reference voltage e3, and the error amplifier ERA3 amplifies the error between the divided voltage VV23 and the voltage VN3. Therefore, as shown in FIG. 4, the voltage VN3 falls in such manner as to follow the drop in the divided voltage VV23. This therefore provides the effect in that the low-order backgate voltage VBGN converges to 0 (V)

in such manner as to follow the convergence of the high-order backgate voltage VBGP to 0 (V).

The above shows that, in the case where a specified voltage relationship is previously fixed so that when the high-order backgate voltage VBGP is 0 (V) the low-order backgate voltage VBGN is also 0 (V), the low-order backgate voltage VBGN can be reduced in such manner as to follow the drop in the high-order backgate voltage VBGP, even when a failure, such as a drop in the high-order backgate voltage VBGP, output discontinuation et cetera, occurs.

As described above in detail, the power supply unit 10 of the first embodiment makes it possible to maintain a voltage relationship in which, even when a situation that causes the high-order backgate voltage VBGP to drop to a lower value occurs, the power supply voltage Vcc constantly has a value equal to or less than the value of the high-order backgate voltage VBGP by limiting the power supply voltage Vcc in conjunction with the high-order backgate voltage VBGP. In addition, the low-order backgate voltage VBGN is limited in conjunction with the high-order backgate voltage VBGP, whereby it becomes possible to maintain a voltage relationship in which, whenever the high-order backgate voltage VBGP is made to be 0 (V), the low-order backgate voltage VBGN is also made to be 0 (V).

In addition, the action of limiting the power supply voltage Vcc according to the high-order backgate voltage VBGP is obtained in the power supply unit 10 by providing a pathway through which the high-order backgate voltage VBGP is fed back to the second non-inverting input of the error amplifier ERA1. This eliminates the need for the provision of a special circuit such as a logical circuit. Therefore, the power supply unit 10 capable of maintaining a specified voltage relationship can be realized without having to employ complicated circuitry.

Figure 5:
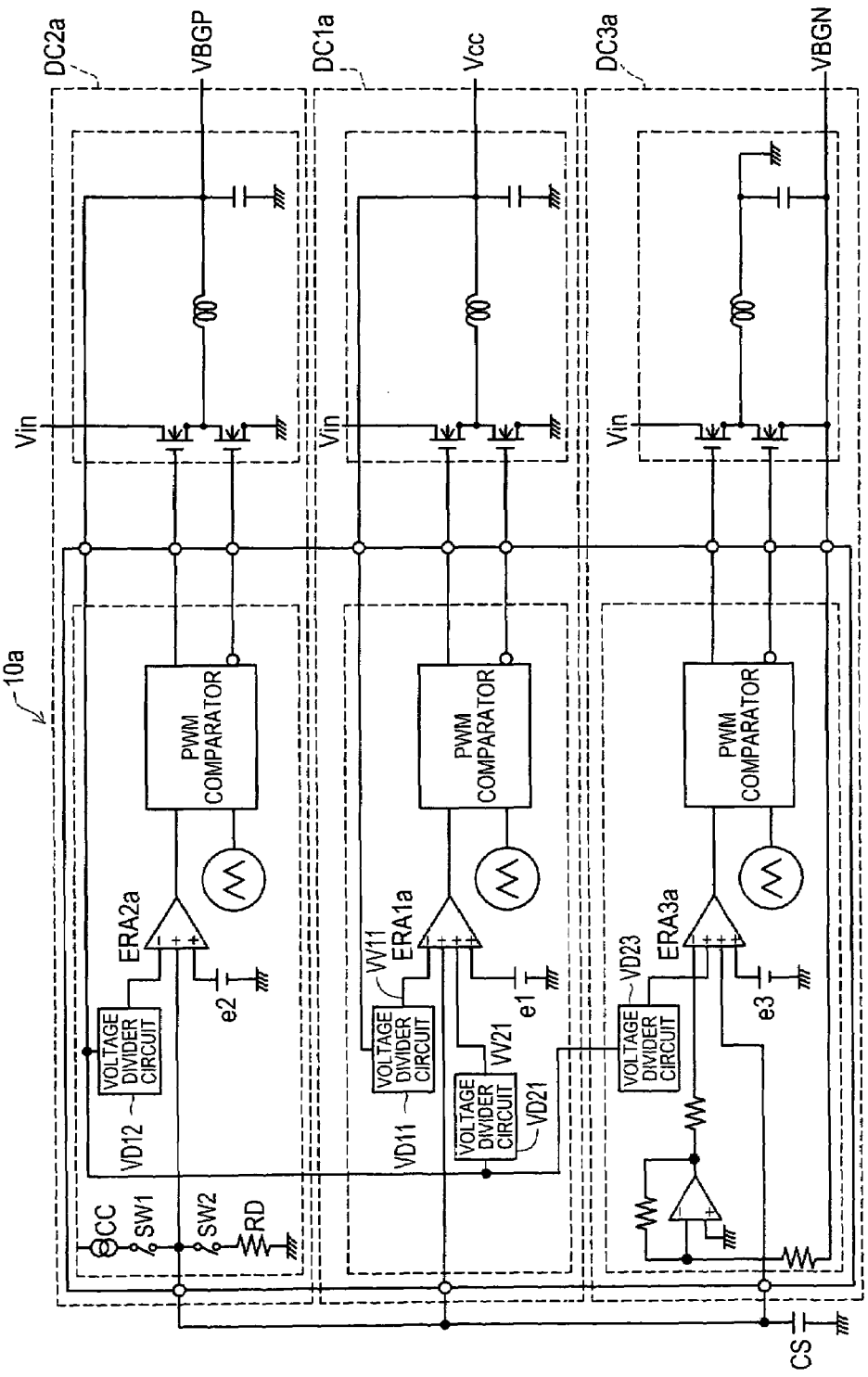
FIG. 5 is a circuit diagram of a power supply unit 10a in accordance with a second embodiment of the present invention.
Figure 6:
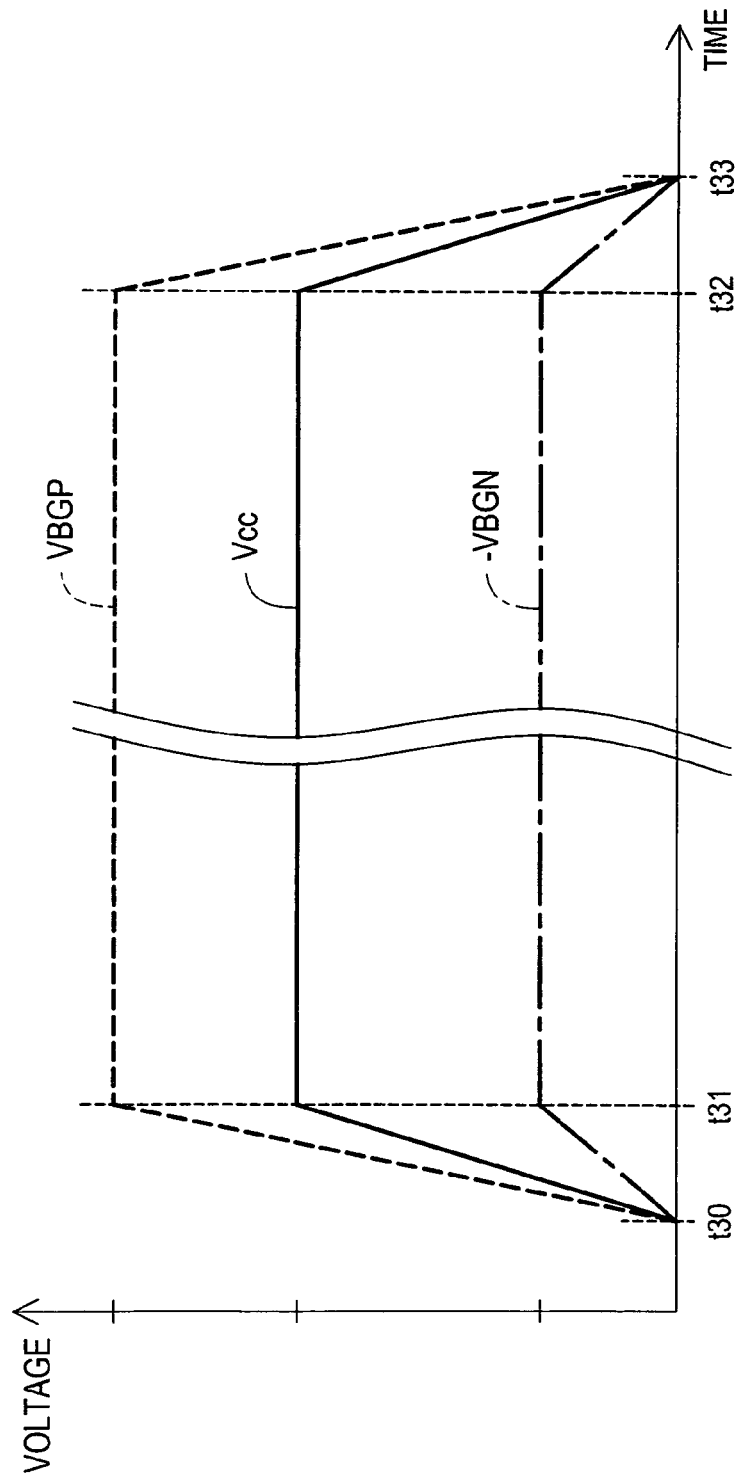

Referring to FIG. 5 and FIG. 6, a second embodiment of the present invention is described. A power supply unit 10*a* formed in accordance with the second embodiment is shown in FIG. 5. In addition to the components of the power supply unit 10 of the first embodiment, the power supply unit 10*a* of the second embodiment further includes a capacitor CS used for ramp gradient control, a constant current circuit CC, a resistor RD, a switch SW1, and a switch SW2. Error amplifiers ERA1*a*, ERA2*a*, and ERA3*a* each have a respective non-inverting input terminal to which the capacitor CS is connected. In addition, the constant current circuit CC is connected, through the switch SW1, to the capacitor CS. One end of the resistor RD is connected to ground while the other end of the resistor RD is connected, through the switch SW2, to the capacitor CS. In addition, the voltage division ratio of the voltage divider circuit VD12 is set lower than the voltage division ratio of the voltage divider circuit VD11. The other configurations are the same as the power supply unit 10 of FIG. 2, and their detailed description is omitted here.

In the first embodiment, the operation of the power supply unit 10 in the steady state is described. When activating or stopping the power supply unit 10, however, ramp gradient control is needed in order to prevent the occurrence of a rush current. In the power supply unit 10*a* of FIG. 5, the error amplifier ERA1*a* of the power supply voltage Vcc is designed to perform an operation of amplifying the difference between the lowest among the reference voltage e1, the divided voltage VV21, and the capacitor's CS output voltage, and the divided voltage VV11 fed into the inverting input.

With reference to FIG. 6, when the power supply unit 10*a* is activated at time t30, the switch SW1 is placed in the conductive state while the switch SW2 is placed in the non-conductive state. Consequently, the capacitor CS is charged by the constant current circuit CC, and the output voltage of the capacitor CS gradually increases from 0 (V). And the power supply voltage Vcc output from a DC-DC converter DC1*a* is subjected to ramp gradient control by the output voltage of the capacitor CS during a period from time t30 until time t31, and gradually increases. And after time t31 at which the output voltage of the capacitor CD has reached the reference voltage e1, the power supply voltage Vcc has a constant value according to the reference voltage e1.

In addition, likewise, the high-order backgate voltage VBGP provided from a DC-DC converter DC2*a* is subjected to ramp gradient control by the output voltage of the capacitor C2 during a period from time t30 until time t31, and gradually increases. At this time, the voltage division ratio of the voltage divider circuit VD12 is set lower than the voltage division ratio of the voltage divider VD11, so that the rising gradient of the high-order backgate voltage VBGP becomes steeper than the rising gradient of the power supply voltage Vcc. And in a period after time t31 at which the output voltage of the capacitor CS has reached the reference voltage e2, the high-order backgate voltage VBGP has a constant value according to the reference voltage e2. In addition, likewise, the absolute value of the low-order backgate voltage VBGN provided from a DC-DC converter DC3*a* is subjected to ramp gradient control by the output voltage of the capacitor CS during a period from time t30 until time t31, and has a constant value according to the reference voltage e3 during a period after time t31.

On the other hand, when the power supply unit 10*a* is stopped at time t32, the switch SW1 is placed in the non-conductive state and the switch SW2 is placed in the conductive state. Consequently, the capacitor CS is discharged and, as a result, the output voltage of the capacitor CS gradually falls. Therefore, the absolute values of the high-order backgate voltage VBGP, the power supply voltage Vcc, and the low-order backgate voltage VBGN are subjected to ramp gradient control by the output voltage of the capacitor CS and then gradually fall. And when the output voltage of the capacitor CS has reached 0 (V) at time t33, the absolute values of the high-order backgate voltage VBGP, the power supply voltage Vcc, and the low-order backgate voltage VBGN also become 0 (V), and the operation of bringing the power supply unit 10*a* to a stop is completed.

As discussed above in detail, in the power supply unit 10*a* of the second embodiment, it is possible to maintain a voltage relationship in which the value of the power supply voltage Vcc is made constantly equal to or lower than the value of the high-order backgate voltage VBGP, even when employing ramp gradient control when the power supply unit 10*a* is to be activated or stopped. In addition, it is possible to maintain a specified voltage relationship in which, when the high-order backgate voltage VBGP is made to become 0 (V), the low-order backgate voltage VBGN is also made to become 0 (V).

Figure 7:
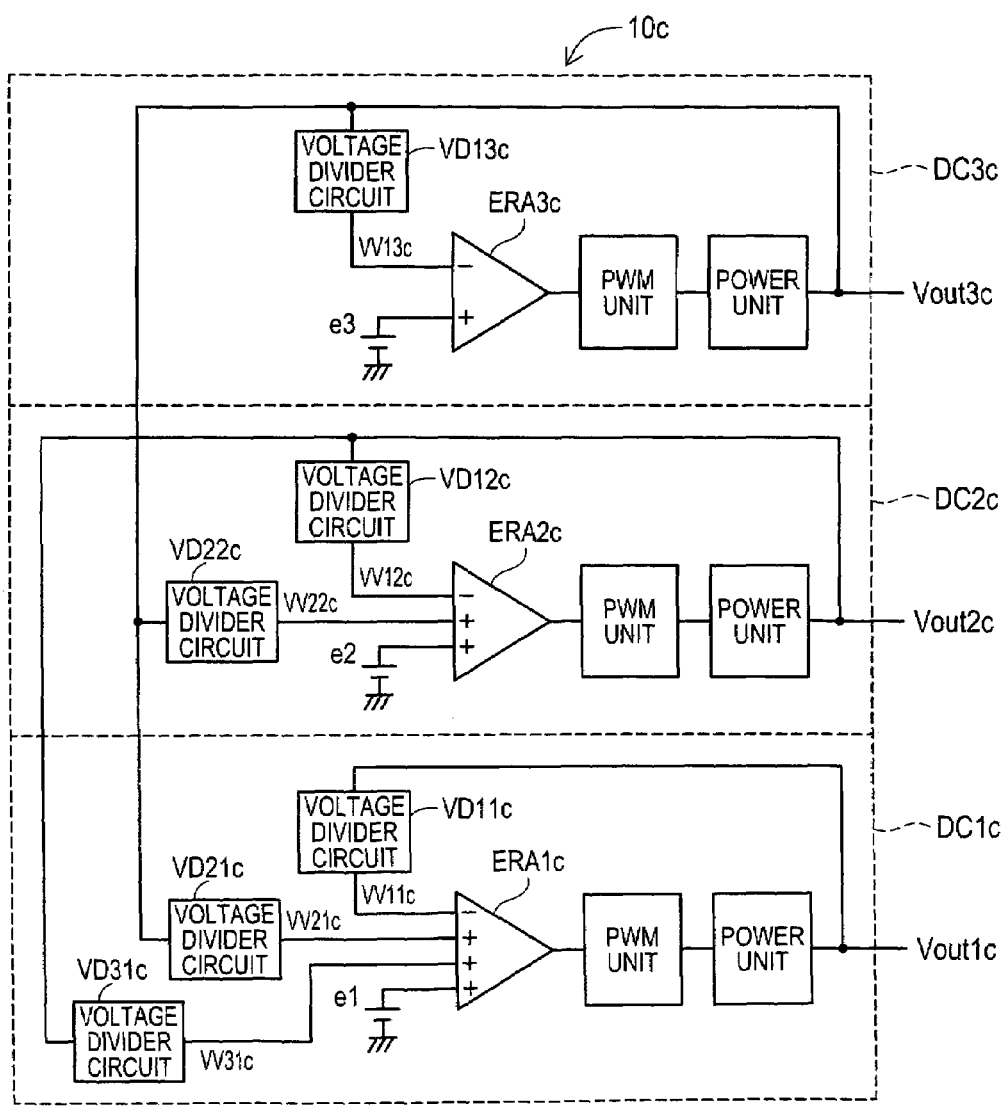
FIG. 7 is a circuit diagram of a power supply unit 10c in accordance with a third embodiment of the present invention.

With reference to FIG. 7, a power supply unit 10*c* formed in accordance with a third embodiment of the present invention is described. This power supply unit 10*c* is a power supply unit capable of maintaining a voltage relationship among three different output voltages, even when a failure occurs. The power supply unit 10*c* is equipped with a DC-DC converter DC1*c*, a DC-DC converter DC2*c*, and a DC-DC converter DC3*c*. The DC-DC converter DC1*c* provides a first output voltage Vout1*c*; the DC-DC converter DC2*c* provides a second output voltage Vout2*c*; and the DC-DC converter DC3*c* provides a third output voltage Vout3*c*. And the description will be made in regard to a case where there is maintained such a voltage relationship among these three output voltages that: Vout1*c* (first output voltage)≦Vout2*c* (second output voltage)≦Vout3*c* (third output voltage).

The inverting input of an error amplifier ERA3c of the DC-DC converter DC3c receives a divided voltage VV13c provided from a voltage divider circuit VD13c. In addition, the reference voltage e3 is fed into the non-inverting input of the error amplifier ERA3c. The reference voltage e2 is fed into the first non-inverting input of an error amplifier ERA2c. In addition, the second non-inverting input of the DC-DC converter DC2c receives a divided voltage VV22c provided form a voltage divider circuit VD22c. The reference voltage e1 is fed into the first non-inverting input of an error amplifier ERA1c of the DC-DC converter DC1c. In addition, the second non-inverting input of the error amplifier ERA1c receives a divided voltage VV21c provided from a voltage divider circuit VD21c while the third non-inverting input of the error amplifier ERA1c receives a divided voltage VV31c provided from a voltage divider circuit VD31c.

The error amplifier ERA1c amplifies the error between the lowest among the reference voltage e1, the divided voltage VV21c, and the divided voltage VV31c, and the divided voltage VV11c. Therefore, the first output voltage Vout1c falls in such manner so as to follow the drop in the second and third output voltages Vout2c, Vout3c. In addition, the error amplifier ERA2c amplifies the error between the lower of the reference voltage e2 and the divided voltage VV22c, and the divided voltage VV12c. Therefore, the second output voltage Vout2c falls in such manner as to follow the drop in the third output voltage Vout3c. In addition, the error amplifier ERA3c amplifies the error between the reference voltage e3 and the divided voltage VV13c. Therefore, neither the first output voltage Vout1c nor the second output voltage Vout2c controls the third output voltage Vout3c.

This assures that the first output voltage Vout1c has a value equal to or less than that of the second and third output voltages Vout2c, Vout3c and further assures that the second output voltage Vout2c has a value equal to or less than that of the third output voltage Vout3c. As a result, even when the power supply unit 10c suffers a failure or the like, it is possible to maintain the aforesaid voltage relationship: Vout1c (first output voltage)≦Vout2c (second output voltage)≦Vout3c (third output voltage).

For the case of the power supply unit 10c, the description was made in regard to a case of maintaining a voltage relationship among three different output voltages, but the invention should be deemed not to be limited to such a manner. Needless to say, it is possible to configure a power supply unit capable of assuring that, among n output voltages provided from n DC-DC converters respectively, a voltage relationship (i.e. first output voltage≦second output voltage≦ . . . ≦nth output voltage) is maintained. In this case, the error amplifier that controls the first output voltage has a second non-inverting input terminal, . . . , and an nth non-inverting input terminal and these non-inverting input terminals receive divided voltages of a second output voltage, . . . , and an nth output voltage, respectively. And it suffices if the error between the lowest among the voltages applied to the first to nth non-inverting input terminals, and the voltage applied to the inverting input terminal is amplified. Likewise, it suffices if the error amplifier that controls the second output voltage has a third non-inverting input terminal, . . . , and an nth non-inverting input terminal which receive divided voltages of a third output voltage, . . . , and an nth output voltage, respectively.

The present invention is not limited to the foregoing embodiment. Needless to say, numerous improvements and modifications may be made without departing from the spirit and scope of the present invention. In regard to the power supply unit 10 (FIG. 2) of the first embodiment, the high-order backgate voltage VBGP is used as a reference, wherein the power supply voltage Vcc is controlled so as to become equal to or lower than the high-order backgate voltage VBGP. That is to say, the error amplifier ERA1 uses, as an error amplification target for the divided voltage VV11 which is fed into the inverting input, the lower of the two voltage inputs fed into the two non-inverting inputs, i.e. the lower of the reference voltage e1 and the divided voltage VV21. This should not, however, be deemed restrictive. Needless to say, it may be arranged such that the power supply voltage Vcc is used as a reference and the high-order backgate voltage VBGP is controlled so as to become equal to or higher than the power supply voltage Vcc.

In this case, the control unit CU2 of the power supply unit 10 is equipped with a voltage divider circuit VD22 which receives the power supply voltage Vcc and which then provides a divided voltage VV22. And the error amplifier ERA2 is equipped with a second non-inverting input into which the divided voltage VV22 is fed. The error amplifier ERA2 amplifies the error between the lower of the two voltage inputs fed into the two non-inverting inputs (i.e. the lower of the reference voltage e2 and the divided voltage VV22), and the divided voltage VV12 fed into the inverting input. As a result of such arrangement, since, even when a failure occurs which causes the high-order backgate voltage VBGP to fall, the high-order backgate voltage VBGP is clamped by the power supply voltage Vcc, this makes it possible to maintain a voltage relationship in which the high-order backgate voltage VBGP is controlled so as to be equal to or higher than the power supply voltage Vcc.

In the power supply unit 10 of the first embodiment, the error amplifier ERA1 of the control unit CU1 is used to maintain a voltage relationship in which the power supply voltage Vcc is made equal to or lower than the high-order backgate voltage VBGP. This arrangement makes it possible to maintain the voltage relationship even when the error amplifier ERA2 of the control unit CU2 fails to operate normally due to a failure or the like. Therefore, in comparison with the manner in which the power supply voltage Vcc serves as a reference and the high-order backgate voltage VBGP is controlled so as to become equal to or higher than the power supply voltage Vcc, the manner in which the high-order backgate voltage VBGP serves as a reference and the power supply voltage Vcc is controlled so as to become equal to or lower than the high-order backgate voltage VBGP is more preferable.

Figure 8:
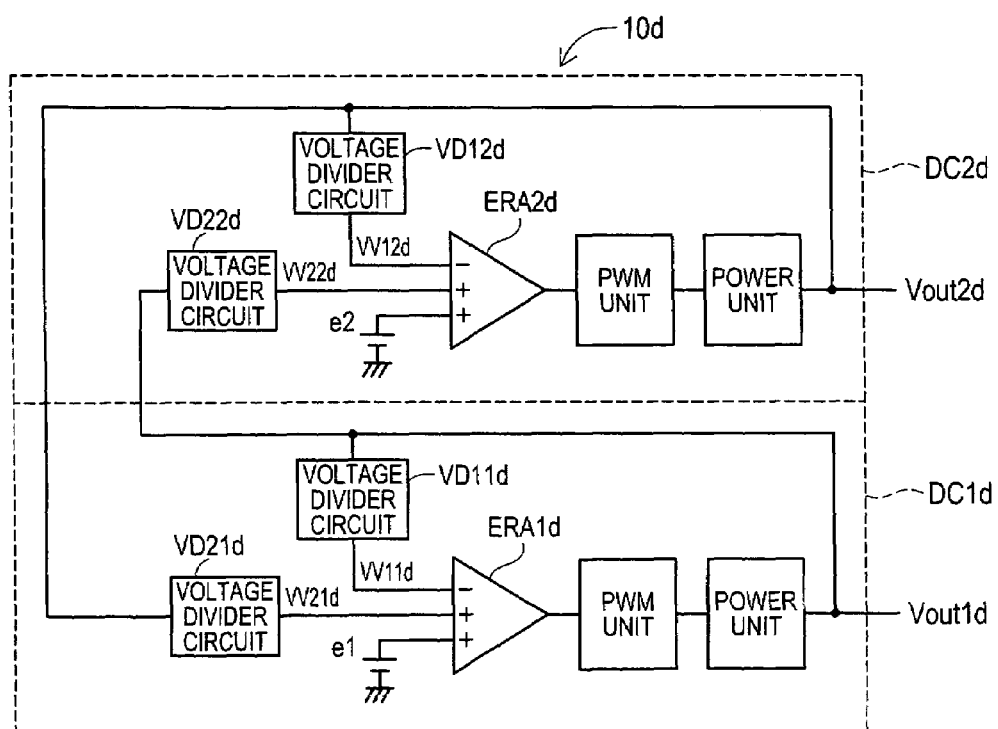
FIG. 8 is a circuit diagram of a power supply unit 10d.

In the power supply unit 10 (FIG. 2) of the first embodiment, the description was made in regard to a one-way voltage relationship between two output voltages, which should not be deemed restrictive. Needless to say, even when there is a two-way voltage relationship between two output voltages, it is possible to assure such a voltage relationship. A power supply unit 10d, shown in FIG. 8, is equipped with a DC-DC converter DC1d and a DC-DC converter DC2d that provide a first output voltage Vout1d and a second output voltage Vout2d, respectively. Here, the description is made in regard to a case where there is a two-way voltage relationship in which the first output voltage Vout1d falls in such manner as to follow the drop in the second output voltage Vout2d and the second output voltage Vout2d falls in such manner as to follow the drop in the first output voltage Vout1d.

A voltage divider circuit VD21d of the DC-DC converter DC1d receives the second output voltage Vout2d and then provides a divided voltage VV21d. Likewise, a voltage divided circuit VD22d of the DC-DC converter DC2d receives the first output voltage Vout1d and then provides a divided voltage VV22d. The first non-inverting input of an error amplifier ERA1d receives the reference voltage e1 while the second non-inverting input of the error amplifier ERA1d receives a divided voltage VV21d. Likewise, the first non-inverting input of an error amplifier ERA2d receives the reference voltage e2 while the second non-inverting input of the error amplifier ERA2d receives the divided voltage VV22d.

The error amplifier ERA1d amplifies the error between the lower of the reference voltage e1 and the divided voltage VV21d, and the divided voltage VV11d, and the first output voltage Vout1d falls in such manner as to follow the drop in the second output voltage Vout2d. Likewise, the error amplifier ERA2d amplifies the error between the lower of the reference voltage e2 and the divided voltage VV22d, and the divided voltage VV12d, and the second output voltage Vout2d falls in such manner as to follow the drop in the first output voltage Vout1d. Consequently, the power supply unit 10d maintains a two-way voltage relationship in which the first output voltage Vout1d falls in such manner as to follow the drop in the second output voltage Vout2d and the second output voltage Vout2d falls in such manner as to follow the drop in the first output voltage Vout1d.

In the power supply unit 10 (FIG. 2) of the first embodiment, the voltage divider circuits VD11, VD12, VD21, and VD23 are provided. These voltage divider circuits are used for matching in voltage range between the output voltages of the DC-DC converters DC1, DC2, and DC3 and the input voltages of the error amplifiers ERA1, ERA2, and ERA3. Therefore, in the case where no voltage range matching is required, the output voltages of the DC-DC converters DC1, DC2, and DC3 may be fed directly (not through these voltage divider circuits) to the error amplifiers. From the above, it is needless to say that the voltage divider circuit is a concept that includes the direct input of the output voltage of the DC-DC converter.

In the present embodiment, the description has been made in regard to the voltage mode type DC-DC converter. Here, the point of the present invention is to provide control so that, on the basis of the high-order backgate voltage VBGP, the power supply voltage Vcc becomes equal to or lower than the high-order backgate voltage VBGP. More specifically, the present invention is characterized in that the high-order backgate voltage VBGP of the DC-DC converter DC1 is fed back to the error amplifier ERA2 of the DC-DC converter DC2. Therefore, it is needless to say that the present invention can be applied not only to voltage mode type DC-DC converters, but also to current mode type DC-DC converters.

In addition, the control circuit 11 of the present embodiment may be made up of for example, a single semiconductor element or a plural number of semiconductor elements. In addition, each of the power supply units 10 to 10d may be made up of a single semiconductor element or a plural number of semiconductor elements. In addition, each power supply unit 10 to 10d or the control circuit 11 may be configured as modules.

As described above, the divided voltage VV11 is fed into the inverting input of the error amplifier ERA1, and the reference voltage e1 and the divided voltage VV21 are fed into the two non-inverting inputs of the error amplifier ERA1. This arrangement should not be deemed restrictive. Needless to say, it may be arranged such that the reference voltage e1 and the divided voltage VV21 are fed as inverting inputs and the divided voltage VV11 is fed as a non-inverting input. To sum up, the inverting input versus non-inverting input relationship of the error amplifier ERA1 is a relationship that is appropriately fixed by the inverting input versus non-inverting input relationship of the PWM comparator PWM1 and the relationship between the output signal VQ1 and the output signal *VQ1.

In addition, the inverting input of the error amplifier ERA1 is an example of the first polarity input terminal; the first non-inverting input of the error amplifier ERA1 is an example of the second polarity first input terminal; the second non-inverting input of the error amplifier ERA1 is an example of the second polarity second input terminal; each of the voltage divider circuits VD11, VD11c, VD12c, VD11d, and VD12d is an example of the first voltage divider circuit; each of the voltage divider circuits VD21, VD23, VD21c, VD22c, VD31c, VV21d, and VV22d is an example of the second voltage divider circuit; the power supply voltage Vcc is an example of the first output voltage; and the high-order backgate voltage VBGP is an example of the second output voltage.

In accordance with the DC-DC converter control circuit, the DC-DC converter, the power supply unit, and the DC-DC converter control method of the present invention, even when any one of a plurality of DC-DC converters enters the abnormal state due to a failure or the like, it is possible to maintain a voltage relationship between the output voltage of the faulty DC-DC converter and the output voltage of another DC-DC converter.

What is claimed is:

1. A control circuit for a DC-DC converter which provides a plurality of output voltages, the control circuit comprising:
   an error amplifier which includes:
      a first polarity input terminal at which a voltage according to a first output voltage of the plurality of output voltages is input;
      a second polarity first input terminal at which a reference voltage for setting a target value for the first output voltage is input; and
      a second polarity second input terminal at which a voltage according to a second output voltage being output from another DC-DC converter is input,
   wherein the error amplifier amplifies an error between: (i) lower one of voltages between the voltage input at the second polarity first input terminal and the voltage input at the second polarity second input terminal; and (ii) the voltage input at the first polarity input terminal,
   wherein the control circuit controls the voltage according to the first output voltage so as to keep a relation between the voltage according to the first output voltage and the voltage according to the second output voltage based on the error.

2. The control circuit as set forth in claim 1, wherein the error amplifier includes a plurality of the second polarity second input terminals, respectively, associated with a plurality of the second output voltages, and amplifies an error between: (i) lower one of voltages between (a) a lowest voltage among voltages input at the plurality of the second polarity second input terminals and (b) the voltage input at the second polarity first input terminal; and (ii) the voltage input at the first polarity input terminal.

3. The control circuit as set forth in claim 1 further comprising:
   a first voltage divider circuit to which the first output voltage is input and which divides the first output voltage to thereby provide a first divided voltage to the error amplifier; and
   a second voltage divider circuit to which the second output voltage is input and which divides the second output voltage to thereby provide a second divided voltage to the error amplifier;

wherein a value of a ratio of the second divided voltage to the second output voltage of the second voltage divider circuit is made equal to or less than a value of a ratio of the first divided voltage to the first output voltage of the first voltage divider circuit.

4. The control circuit as set forth in claim 3 further comprising:
a control circuit for the another DC-DC converter which provides the second output voltage; and
a third voltage divider circuit to which the second output voltage is input and which divides the second output voltage to thereby provide a third divided voltage to an error amplifier provided in the control circuit for the another DC-DC converter,
wherein a value of a ratio of the third divided voltage to the second output voltage of the third voltage divider circuit is made less than the value of the ratio of the first divided voltage to the first output voltage of the first voltage divider circuit.

5. The control circuit as set forth in claim 1, wherein:
the error amplifier has a second polarity third input terminal to which a capacitor which is charged or discharged by ramp gradient control is connected; and
the error amplifier amplifies an error between: (i) a lowest voltage among the voltages input at the second polarity first to third input terminals; and (ii) the voltage input at the first polarity input terminal.

6. The control circuit as set forth in claim 1 further comprising an inversion amplifier circuit which inverts a polarity of the first output voltage to be input to the first polarity input terminal
wherein the first output voltage is a voltage of an opposite polarity to the second output voltage.

7. The control circuit as set forth in claim 1,
wherein the error amplifier further comprises a second polarity third input terminal at which a voltage according to a third output voltage being output from another DC-DC converter is input, and
wherein the error amplifier amplifies an error between: (i) a lowest voltage among the voltage input at the second polarity first input terminal, the voltage input at the second polarity second input terminal and the voltage input at the second polarity third input terminal; and (ii) the voltage input at the first polarity input terminal.

8. A DC-DC converter which provides a plurality of output voltages, the DC-DC converter comprising:
an error amplifier which includes:
a first polarity input terminal at which a voltage according to a first output voltage of the plurality of output voltages is input;
second polarity first input terminal at which a reference voltage for setting a target value for the first output voltage is input; and
a second polarity second input terminal at which a voltage according to a second output voltage being output from another DC-DC converter is input,
wherein the error amplifier amplifies an error between: (i) lower one of voltages between the voltage input at the second polarity first input terminal and the voltage input at the second polarity second input terminal; and (ii) the voltage input at the first polarity input terminal,
wherein the DC-DC converter controls the voltage according to the first output voltage so as to keep a relation between the voltage according to the first output voltage and the voltage according to the second output voltage based on the error.

9. The DC-DC converter as set forth in claim 8 further comprising:
a first voltage divider circuit to which the first output voltage is input and which divides the first output voltage to thereby provide a first divided voltage to the error amplifier;
a second voltage divider circuit to which the second output voltage is input and which divides the second output voltage to thereby provide a second divided voltage to the error amplifier;
a control circuit for the another DC-DC converter which provides the second output voltage; and
a third voltage divider circuit to which the second output voltage is input and which divides the second output voltage to thereby provide a third divided voltage to an error amplifier provided in the control circuit for the another DC-DC converter,
wherein a value of a ratio of the second divided voltage to the second output voltage of the second voltage divider circuit is made equal to or less than a value of a ratio of the first divided voltage to the first output voltage of the first voltage divider circuit, and
wherein a value of a ratio of the third divided voltage to the second output voltage of the third voltage divider circuit is made less than the value of the ratio of the first divided voltage to the first output voltage of the first voltage divider circuit.

10. The DC-DC converter as set forth in claim 8,
wherein the error amplifier further comprises a second polarity third input terminal at which a voltage according to a third output voltage being output from another DC-DC converter is input, and
wherein the error amplifier amplifies an error between: (i) a lowest voltage among the voltage input at the second polarity first input terminal, the voltage input at the second polarity second input terminal and the voltage input at the second polarity third input terminal; and (ii) the voltage input at the first polarity input terminal.

11. A semiconductor device for controlling a DC-DC converter which provides a plurality of output voltages the semiconductor device comprising:
an error amplifier which includes:
a first polarity input terminal at which a voltage according to a first output voltage of the plurality of output voltages is input;
a second polarity first input terminal at which a reference voltage for setting a target value for the first output voltage is input; and
a second polarity second input terminal at which a voltage according to a second output voltage being output from another DC-DC converter is input,
wherein the error amplifier amplifies an error between: (i) lower one of voltages between the voltage input at the second polarity first input terminal and the voltage input at the second polarity second input terminal; and (ii) the voltage input at the first polarity input terminal,
wherein the semiconductor device controls the voltage according to the first output voltage so as to keep a relation between the voltage according to the first output voltage and the voltage according to the second output voltage based on the error.

12. The semiconductor device as set forth in claim 11 further comprising:
a first voltage divider circuit to which the first output voltage is input and which divides the first output voltage to thereby provide a first divided voltage to the error amplifier;

a second voltage divider circuit to which the second output voltage is input and which divides the second output voltage to thereby provide a second divided voltage to the error amplifier;

a control circuit for the another DC-DC converter which provides the second output voltage; and a third voltage divider circuit to which the second output voltage is input and which divides the second output voltage to thereby provide a third divided voltage to an error amplifier provided in the control circuit for the another DC-DC converter, wherein a value of a ratio of the second divided voltage to the second output voltage of the second voltage divider circuit is made equal to or less than a value of a ratio of the first divided voltage to the first output voltage of the first voltage divider circuit, and wherein a value of a ratio of the third divided voltage to the second output voltage of the third voltage divider circuit is made less than the value of the ratio of the first divided voltage to the first output voltage of the first voltage divider circuit.

13. The semiconductor device as set forth in claim 11, wherein the error amplifier further comprises a second polarity third input terminal at which a voltage according to a third output voltage being output from another DC-DC converter is input, and wherein the error amplifier amplifies an error between: (i) a lowest voltage among the voltage input at the second polarity first input terminal, the voltage input at the second polarity second input terminal and the voltage input at the second polarity third input terminal; and (ii) the voltage input at the first polarity input terminal.

14. A control method for controlling a DC-DC converter which provides a plurality of output voltages, the DC-DC converter control method comprising:

outputting a voltage according to a first output voltage of the plurality of output voltages;

outputting a reference voltage for setting a target value for the first output voltage;

outputting a voltage according to a second output voltage being output from another DC-DC converter; and amplifying an error between: (i) lower one of voltages between the reference voltage and the voltage according to the second output voltage; and (ii) the voltage according to the first output voltage, wherein the control method controls the voltage according to the first output voltage so as to keep a relation between the voltage according to the first output voltage and the voltage according to the second output voltage based on the error.

* * * * *